Jan. 12, 1932.   A. G. RAYBURN ET AL   1,840,866
POWER TRANSMISSION APPARATUS
Original Filed March 24, 1924   9 Sheets-Sheet 8

INVENTORS
Alden G. Rayburn
Elwyn M. Rayburn
James W. Sumner
by White, Prost & Evans
their ATTORNEYS

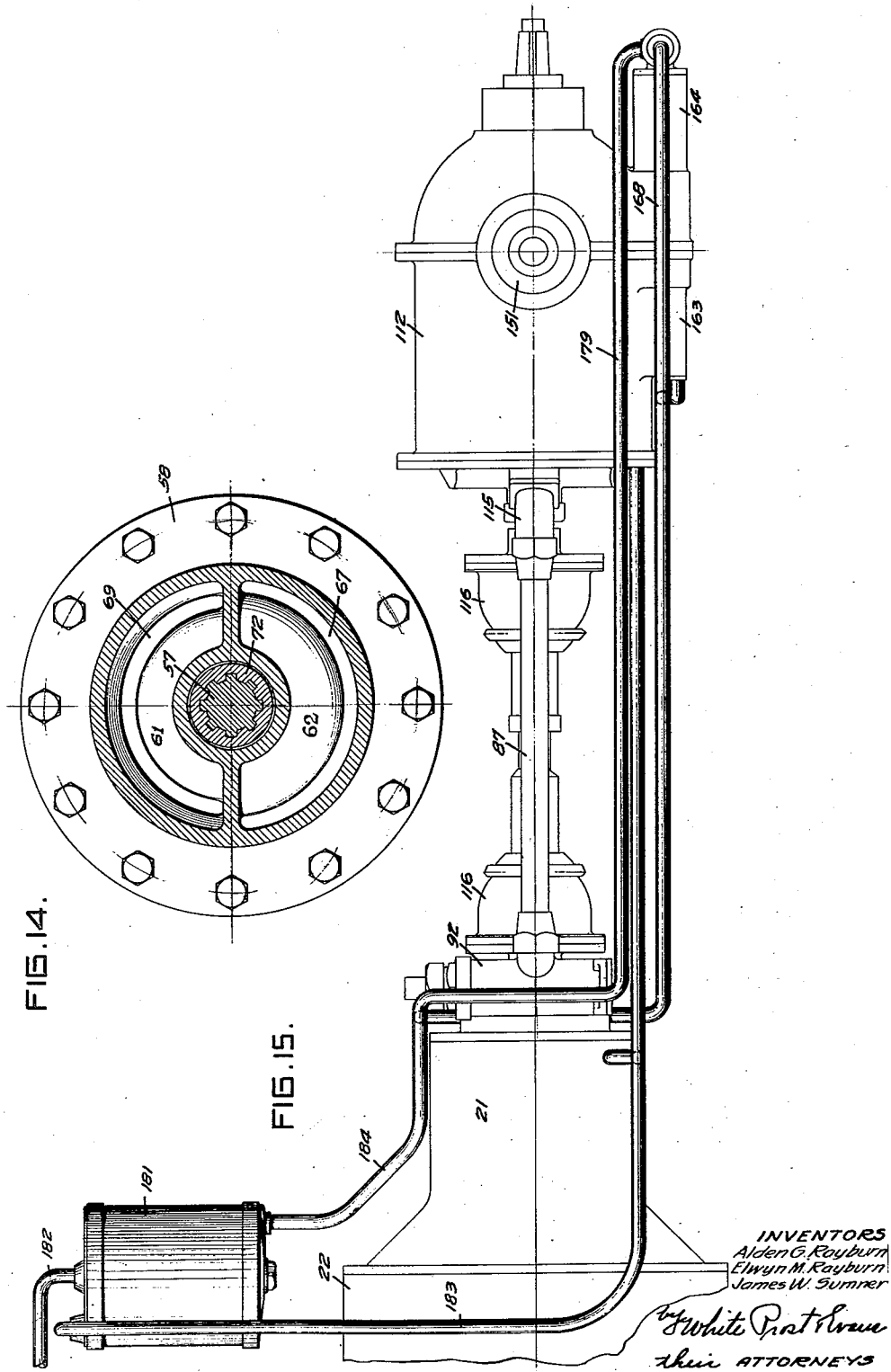

Patented Jan. 12, 1932

1,840,866

UNITED STATES PATENT OFFICE

ALDEN G. RAYBURN, OF SAUSALITO, ELWYN M. RAYBURN, OF SAN FRANCISCO, AND JAMES WAYNE SUMNER, OF LOS ANGELES, CALIFORNIA, ASSIGNORS, BY MESNE ASSIGNMENTS, OF FIFTY-ONE ONE-HUNDREDTHS TO AUTOMOTIVE ENGINEERING CORPORATION, A CORPORATION OF DELAWARE

POWER TRANSMISSION APPARATUS

Application filed March 24, 1924, Serial No. 701,489. Renewed September 14, 1931.

The invention relates to a variable speed, variable torque power transmission apparatus for transmitting power from a driving element to a driven element and particularly to an apparatus employing liquid as the power transmitting medium.

An object of the invention is to provide a variable speed, variable torque power transmission apparatus having the function of a clutch and so constructed as to utilize the energy expended by the slippage of the clutch to assist in driving the driven element.

Another object of the invention is to provide a two unit power transmission apparatus for use in internal combustion engine driven vehicles in which one unit, the pump unit, is arranged adjacent the engine, and the other unit, the motor unit, is spaced from the engine and arranged between the engine and the driving axle.

Another object of the invention is to provide a variable speed, variable torque power transmission apparatus in which the relative speed of the driven shaft with respect to the driving shaft is varied in accordance with variations in load on the engine.

A further object of the invention is to provide a hydraulic power transmission apparatus in which the parts are constructed and arranged to reduce leakage of the liquid to a minimum and, further, in which the leakage liquid is accumulated and returned to the hydraulic system.

A further object of the invention is to provide a hydraulic power transmission apparatus capable of being manipulated to cause rotation of the driven shaft in opposite directions when desired and to lock the driven shaft against rotation.

The apparatus comprises a pump unit in which the liquid is placed under pressure and a motor unit in which the liquid under pressure is caused to do work to assist in propelling the vehicle. The apparatus, in effect, has the function of a clutch, with the exception that the energy expended by the slippage of the clutch, is utilized in driving the driven shaft. The elements of the clutch are contained in the pump unit, one of the elements being a cylinder block in which pistons reciprocate to place the liquid under pressure and the other unit being the backing for the bearing of an inclined disc to which the pistons in the cylinder block are connected, the relative speeds of the backing and the cylinder block serving to determine the displacement volume of the cylinder block per revolution of the cylinder block. The backing is driven by the forces of reaction acting thereon during the time of rotation of the cylinder block and the magnitude of these forces is controlled by the pressure developed in the cylinders. The reaction tends to rotate the backing plate at a speed in excess of that at which it is permitted to rotate and the difference in speed of the cylinder block and the backing plate, determines the displacement volume of the cylinder block per revolution thereof. The speed of rotation of the backing plate is controlled by the hydraulic displacement of the motor and this displacement is a function of the difference between the reactance and the volume of liquid flow, or the amount of liquid displaced per unit of time. The hydraulic displacement of the motor, per revolution, is variable and by varying this displacement, the relative speed of the cylinder block and the backing plate are determined and the torque delivered to the driven shaft, is a function of the relative speed of the cylinder block and the backing plate. This construction produces a differential drive between the driving shaft and the driven shaft and this differential is variable by varying the displacement volume of the cylinders in the motor. This can also be accomplished by varying the displacement value of the cylinders in the pump or the displacement value of the cylinders in both the pump and the motor. The displacement volume of the cylinders in the motor is preferably controlled by the pressure of the liquid discharged by the pump and this pressure is a function of the load on the driven shaft, so that the displacement volume of the motor and consequently the relative speed of the backing plate and the cylinder block, are controlled by variations in the load on the driven shaft.

The invention possesses other advantageous features, some of which, with the foregoing, will be set forth at length in the following description, where we shall outline in full that form of our invention which we have selected for illustration in the drawings accompanying and forming part of the present specification. In said drawings we have shown one specific type of power transmission apparatus embodying our invention, but it is to be understood that we do not limit ourselves to such form, since the invention, as set forth in the claims, may be embodied in a plurality of forms.

Referring to said drawings:

Figure 14 is a cross-section taken on the line 14—14 Figure 1, looking in the direction of the arrows.

Figure 15 is a side elevation of the power transmission apparatus showing the connections between the two units, the means for removing the surplus leakage liquid from the casings and the means for returning this liquid to the system.

Figure 1:
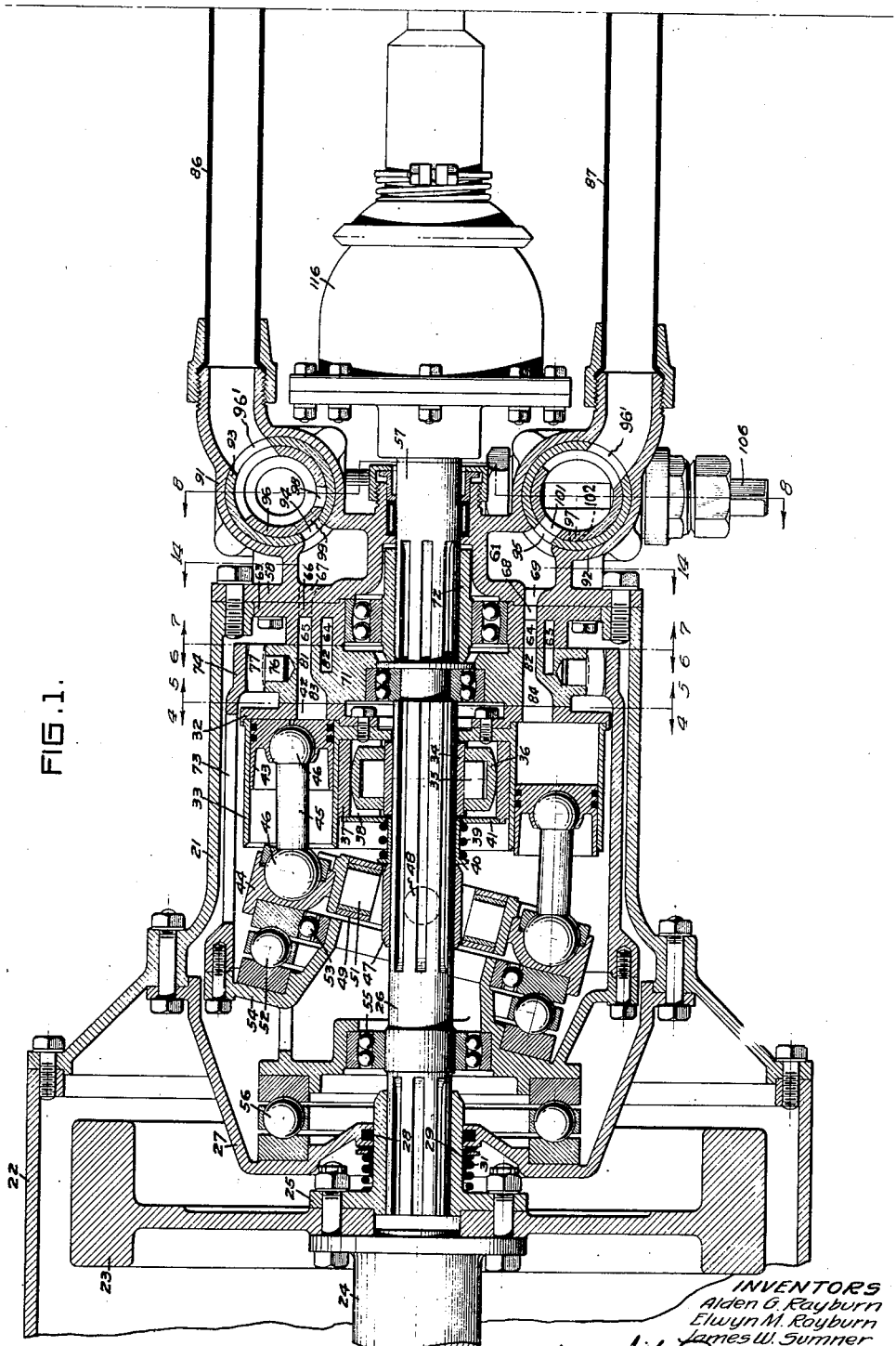
Figure 1 is a slightly distorted horizontal section through the pump unit forming part of the power transmission apparatus of our invention.
Figure 2:
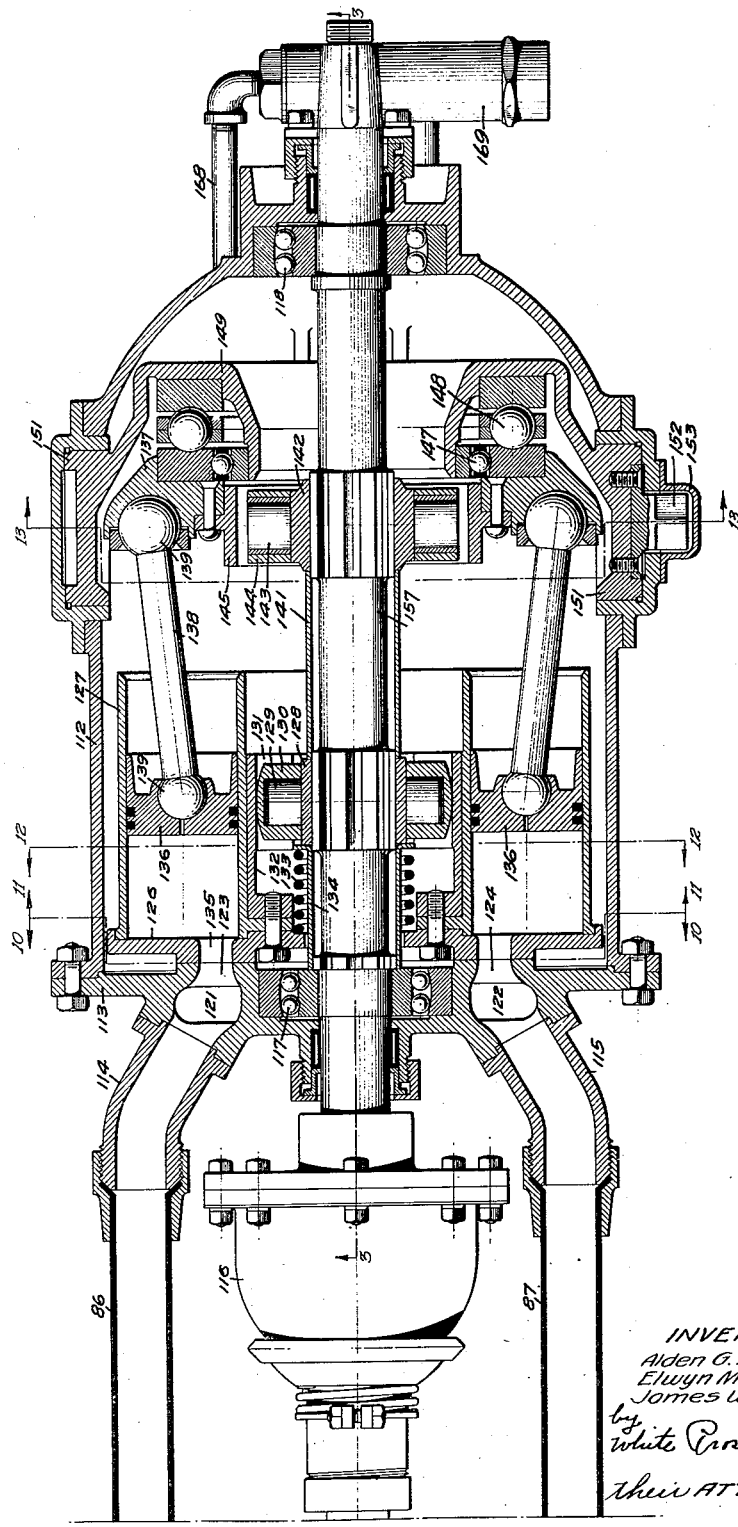
Figure 2 is a slightly distorted horizontal section through the motor unit forming part of the power transmission apparatus of our invention, Figure 2 comprising an extension of Figure 1.

The apparatus comprises generally two units, a pump unit and a motor unit, the two units being connected together by conduits to permit the circulation of liquid between them. The units are also connected together by a driven shaft, the speed of which is controlled by the motor and which shaft controls the rotation of the backing plate forming part of the pump. The pump is preferably supported on the engine and is directly connected to the crank shaft of the engine. The motor unit is preferably spaced away from the pump unit and in automobile truck and bus practice is preferably arranged substantially midway between the engine and the rear driving axle. We shall describe the units of the apparatus separately and then set forth their inter-connection and mode of operation.

The pump comprises a stationary outer casing 21 which is suitably secured to a housing 22 which is in turn secured either to the engine or to a portion of the vehicle frame which is stationary with respect to the engine. Disposed within the housing 22 is the fly-wheel 23 of the engine, to which the crank shaft 24 of the engine is secured. Secured to the fly-wheel is a flanged collar 25 which is splined on and securely attached to the driving shaft 26, which is disposed within the casing 21. The joint between the end-plate 27 of the casing and the rotatable collar 25 is sealed by a packing ring 28 and a flange packing 29, the flange packing being retained tightly in contact with the end-plate 27 and the collar 25 by the coiled spring 31.

Mounted on and rotatable with the driving shaft 26 is the pump cylinder block which comprises a face-plate 32 to which a plurality of open-end cylinders 33 are secured. The cylinders 33 are arranged with their axes parallel to the axis of the driving shaft 26 and are spaced apart circumferentially around the axis of said driving shaft, in the present instance there being 9 pump cylinders 33. The cylinder block is preferably connected to the driving shaft 26, by a universal joint, so that the cylinder block may be permitted to wobble slightly with respect to the axis of the driving shaft 26, whereby the face-plate may remain in full surface contact with a valve-plate arranged in contact therewith. In the operation of the apparatus, pressures of a considerable magnitude are developed and it is necessary, in order to prevent undue leakage, that the faces of these relatively movable elements remain in substantially perfect contact. Due to the difficulty of invariably securing accurate alinement of the axes of the rotating parts and accurate contact of the contacting faces, the cylinder block is preferably mounted so that it has a certain degree of freedom of movement, so that it may move to cause the face-plate 32 to always remain in tight surface contact with the valve plate. The universal joint comprises an inner ring or collar 34 secured to the driving shaft. The collar is provided with radially extending pins 35 and arranged on each pin is a block 36 having parallel sides disposed in longtudinal planes. These planes are parallel to the axis of the driving shaft 26 and the blocks 36 are rotatably mounted on the cylindrical pins 35. Secured to the cylinder block is a ring 37 having longitudinal slots 38 therein, in which the blocks 36 fit snugly but with sufficient clearance to permit the cylinder block to rock with respect to the blocks 36. The blocks 36 are provided with curved heads, concentric with a point on the axis of the driving shaft 26 and these curved heads are in contact with the inner faces of the slots 38 in the ring 37, so that the cylinder block may wobble slightly with respect to the axis of the driving shaft. The cylinder block is normally pressed into tight engagement with the valve-plate by a coiled spring 39 mounted on a sleeve 40 secured to the shaft and bearing against the end-plate 41, which is secured to the ring 37. It is apparent from this construction that the cylinder block is driven synchronously with the driving shaft and is immovable circumferentially and radially with respect to the driving shaft but is permitted a limited wobble in a plane normal to the axis of the driving shaft, so that the cylinder block may conform its position to irregularities in construction or assembly or to irregularities due to wear of the parts.

Each cylinder 33 is provided with a port 42 extending through the face-plate 32, the ports being spaced apart regularly circumferentially with respect to the axis of the driving shaft and being preferably arranged adjacent the sides of the cylinders lying nearest to the driven shaft.

Disposed in each cylinder 33 is a piston 43 which is reciprocated to cause the inflow and discharge of liquid from the cylinders. The pistons 43 are reciprocated by the rotatable wobble ring 44 which is disposed at an angle to the axis of the driving shaft 26 and which rotates synchronously with the driving shaft. The pistons are connected to the wobble ring by piston rods 45 which are preferably connected to the pistons and to the wobble ring by ball and socket joints 46 to accomodate the varying angularity of the piston rods with respect to the plane of the wobble ring and to the axis of movement of the pistons, the wobble ring being so connected to the driving shaft 26 by a universal joint that it is permitted a free wobbling movement. Secured to the driving shaft 26 is a sleeve 47 provided with diametrically opposed pins 48 which seat in the gimbal ring 49 forming part of the said universal joint connecting the wobble ring 44 to shaft 26. The wobble ring 44 is provided with two inwardly extending pins 51 which seat in the gimbal ring 49, the axis of the pins 51 being at right angles to the axis of the pins 48, thereby completing the universal joint between the driving shaft 26 and the wobble ring 44.

The wobble ring 44 is mounted for rotation by means of the bearings 52—53 on the inclined backing plate 54 which is in turn mounted on the drive shaft 26 and the end-plate 27 of the casing by the bearings 55 and 56. The backing plate 54 is inclined to the axis of the driving shaft 26 and the wobble ring 44 lies in a plane parallel to the inclined plane of the backing ring. The backing ring 54 is rotatable and the wobble ring 44 is rotatable and the difference in the speed of rotation of the backing plate and the wobble ring determines the volumetric displacement of the cylinders per revolution of the cylinder block. If the backing ring and the wobble ring, rotate at the same speed, there will be no movement of the pistons in the cylinders and consequently no displacement of liquid from the cylinders. If the backing plate is held stationary in forward operation while the driving shaft is rotated, the displacement of liquid from the cylinders per revolution thereof, is greatest for the forward rotation of the driven shaft. Therefore, by controlling the speed of rotation of the backing plate with respect to the speed of rotation of the cylindric block, the volumetric displacement of the cylinders per revolution thereof is controlled. The reaction of the cylinders tends to cause the backing plate to rotate at the same speed as the cylinder block but means are provided for controlling the speed of the backing plate to control the displacement of the cylinders. The backing plate 54 is connected to the driven shaft 57, the forward end of which extends into the pump casing and the rear end of which is disposed in the motor casing and means are provided in the motor for controlling the speed of the driven shaft and consequently the speed of the backing plate. The magnitude of the reaction tending to cause rotation of the backing plate 54, depends upon the pressures developed in the cylinders 33 and, when the apparatus is employed to transmit power, pressures of varying magnitude are developed in the cylinders, these pressures varying with the load on the driven shaft, so that the backing plate 54 is always subjected to forces tending to rotate it. These forces are opposed by forces produced in the motor and the motor forces are adjustable to provide a relative variation of speed of the backing plate with respect to the cylinder block.

Secured to the end of the pump casing 21 is a casing or end-plate 58 having 2 separated chambers 61—62 therein, these chambers being designated, respectively, the low pressure chamber 61 and the high pressure chamber 62. The chamber 62 is in communication with the discharge side of the cylinders and the chamber 61 is in communication with the inlet side of the cylinders. It is understood, that during the rotation of the cylinder block and the reciprocation of the pistons therein, that some of the cylinders are discharging liquid under pressure and some of the cylinders are receiving liquid under low pressure or under atmospheric pressure. Means are provided for causing the liquid discharged from the cylinders to pass to the high pressure chamber 62, whence the liquid under pressure passes to the motor. The liquid under low pressure returning from the motor, passes into chamber 61 whence it flows into the cylinders during the suction stroke of the pistons therein. The control means is so coordinated with the reciprocation of the pistons, that the chamber 62 receives the liquid discharged from the cylinders and the cylinders draw liquid from the chamber 61.

Secured to the end-plate 58 and forming a tight joint therewith is a distributor plate 63 having passages therein for the liquid. The distributor plate 63 is provided with a face normal to the axis of the driving shaft 26 and this face is provided with two circular concentric grooves or passages 64—65. On its rear face, that is, the face in contact with the plate 58, the distributor plate 63 is provided with a semi-circular port 66 which communicates with the circular passage 65 and with the semi-circular port 67 opening through the plate 58 into the high pressure chamber 62. The groove 65 may therefore be considered as the high pressure groove. The plate 63 is also provided on its rear face with a semi-circular port 68 which is diametrically opposed to the semi-circular port 66 and which opens at one side into the circular groove 64 and at the other side into the semi-circular port 69 extending through the plate 58 into the low pressure chamber 61. The groove 64 may therefore be termed the low pressure groove or passage.

Control means are interposed between the distributor plate 63 and the face-plate 32 of the cylinder block to control the flow of liquid so that the liquid discharged from the cylinders passes into the groove 65 and the liquid received by the cylinders passes through the groove 64. This means comprises a valve-plate 71 having one of its faces in surface contact with the face-plate 32 and having its other face in contact with the face of the distributor plate 63. The valve-plate 71 is secured to the end of the driven shaft 57 by the integral flange 72 so that the valve-plate rotates synchronously with the driven shaft and the valve-plate also serves as the means of connection between the driven shaft and the backing plate 54, so that the driven shaft, the valve-plate and the backing plate, rotate synchronously. The backing plate is connected to the valve-plate by a cage 73 which, at one end, is secured to the backing plate and which at the other end is flexibly secured to the valve-plate, so that the valve plate is free to wobble slightly to accommodate itself to any irregularities in construction or assembly or irregularities due to wear, so that the valve-plate is always in full surface contact with the face plate 32 and the distributor plate 63. The cage 73 is provided on its end with a flange 74 which is provided with four longitudinal slots 75 (Figure 6), spaced apart regularly circumferentially, so that the two pairs of opposed slots are arranged in planes at right angles to each other. Seated in the periphery of the valve-plate 71 are four pins 76 having rectangular heads 77 which are disposed in the slots 75. The tops of the heads 77 are longitudinally curved on a circle concentric with a point on the axis of the driven shaft and the top faces of the heads are in contact with the bottoms of the slots or grooves 75. The periphery of the valve-plate 71, between the pins 76, is a spherical surface generated from a point on the axis of the driven shaft and this curved face is in contact with the flat face of the inner surface of the collar 74. This construction, while insuring synchronous rotation of the cage 73 and the valve-plate 71, also permits the valve-plate 71 to wobble slightly when necessary to maintain a full surface contact with the face of the end-plate 32 and the face of the distributor-plate 63. Plate 71 by means of this construction is free to move and is held in fluid sealing engagement against valve plate 63 by the reactance of the pump cylinder block, and the reactance of the pump backing disk is transmitted through bearing 56 to the stationary case, holding the parts in fluid sealing relation in operation of the device. The valve-plate 71 is provided on one face, that which is in contact with the distributor plate 63, with two circumferential grooves 81—82 concentric with and in continuous communication with the high pressure and low pressure grooves 65—64, respectively. On its other face, that is, the face which is in contact with the face-plate 32, the valve-plate 71 is provided with two diametrically opposed substantially semi-circular ports 83—84, the port 83 being in communication with the circular groove 81 and the port 84 being in communication with the circular groove 82. The port 83 is therefore the high pressure port and the port 84 is the low pressure port. The valve disc is arranged so that the high pressure port 83 is brought into communication with the cylinder at the time of the beginning of the discharge stroke of the piston therein, so that the liquid under pressure, discharged from the cylinder, is conducted to the high pressure chamber 62. The port 84, being diametrically opposed to the port 83, establishes communication with the cylinder at the time of the beginning of the suction stroke of the pistons therein, permitting liquid to flow into the cylinder. Since the reciprocation of the pistons is controlled by the rotation of the backing plate 54 and, since the backing plate 54 rotates synchronously with the valve-plate 71, the high pressure liquid will always be discharged into the chamber 62 and the cylinders will always draw liquid from the low pressure chamber 61. The ports 83 and 84 are spaced apart a short distance at their adjacent ends (Figure 5) and this unported portion of the face of the valve-plate passes the ports 42 of the cylinders at the time that the cylinders are at dead center, at either end of their stroke. In order to prevent hammer, due to the sudden establishing of communication between the port 83 or 84 and the port 42, the ports 83 and 84 are provided with constricted extensions 85 at their ends, to cause a gradual acceleration or deceleration of the liquid as communication with the part 42 is established or broken.

The liquid under pressure, from the high pressure chamber 62, is conducted to the motor, wherein it does useful work, and then is conducted from the motor back to the low pressure chamber 61. Normally the high pressure liquid flows to the motor through the pipe 86 and returns from the motor through the pipe 87, this direction of flow serving to drive the vehicle in the forward direction; when it is desired to drive the vehicle in the reverse direction, the direction of flow of liquid is reversed so that the direction of rotation of the driven shaft 57 is reversed. In this reverse operation the high pressure liquid passes to the motor through the pipe 87 and returns to the pump through the pipe 86.

Means are provided for reversing the direction of flow of the liquid through the pipes 86 and 87 and this means comprises valves for establishing communication between the high pressure chamber 62 and the pipe 87, instead of between the high pressure chamber 62 and the pipe 86, and for establishing communication between the low pressure chamber 61 and the pipe 86 instead of between the low pressure chamber 61 and the pipe 87. Formed in the casing or end plate 58 at opposite sides thereof are valve housings 91—92 with which the pipes 86 and 87 communicate, respectively. These valve housings are arranged adjacent the contiguous opposite ends of the low pressure and high pressure chambers 61 and 62 and are provided with valves for establishing communication between the housings and either of the chambers. Disposed in each housing is a hollow bushing 93 having ports 94 and 95 communicating with the low pressure chamber and ports 94' and 95' connecting with the high pressure chamber. Openings 96' (Figure 1) are provided to establish fluid communication with pipe connections 86 and 87. Disposed within the respective bushings and forming leak-proof joints therewith are hollow cylindrical valves 96—97 which are provided with circumferentially spaced ports for establishing communication between the interior of the valve and either of the chambers 61—62. The valve 96 is provided with a port 98 adapted to establish communication with the low pressure chamber 61 and with a vertically and circumferentially spaced port 99 adapted to establish communication with the high pressure chamber 62. The valve 97 is provided with a port 101 adapted to establish communication with the low pressure chamber 61 and with a vertically and circumferentially spaced port 102 adapted to establish communication with the high pressure chamber 62. In Figure 1 the valves are set so that the valve 96 establishes communication, through the port 99, with the high pressure chamber 62, and the valve 97, establishes communication with the low pressure chamber 61, through the port 101. The ports 101 and 102 and the ports 98 and 99 are preferably spaced apart circumferentially 45 degrees so that by turning both valves in the proper direction through an angle of 45 degrees, the direction of the flow of fluid is reversed. By turning the valves in the opposite direction, both ports 94 and 95 are closed, thereby locking the system and preventing the flow of liquid therein. This may be accomplished by turning the high pressure valve only so that it operates to prevent the flow of liquid under pressure from the high pressure chamber 62. Clutch valve 105 is then opened establishing communication between pipes 86 and 87 thereby substantially relieving the pressure in the motor. The valves 96 and 97 are provided with stems 103 extending from the casing and these stems may be suitably connected together and provided with operating means, such as a reverse lever, or they may be separately provided with operating levers. It is seen, therefore, that the direction of rotation of the driven shaft 57 may be reversed by moving the valves 96 and 97 to reverse the direction of the flow of liquid through the pipes 86 and 87.

Means are also provided for quickly rendering the apparatus inoperative when it is desired to disconnect the internal combustion engine from the rear axle, this means serving the function of the clutch in the usual automobile construction. This is accomplished by providing means for directly connecting the low pressure and high pressure chambers 61 and 62 together, so that the liquid is short-circuited thereby substantially reducing the fluid pressure generated. When the motor is stationary, the driven shaft 57 is stationary, except in the event that the vehicle is still moving, and the liquid pumped is merely circulated through the pump. The interiors of the two hollow valves 96 and 97 are connected together by a conduit 104 in which is disposed a rotatable valve 105 which controls the passage of liquid through the conduit. The valve is provided with a stem 106 to which the usual clutch pedal may be attached and depression of the pedal opens the valve and permits the free circulation of the liquid from the valve 96 to the valve 97, thereby short-circuiting the system. The release of the pedal closes the valve 105 and causes the liquid to be transmitted to the motor.

The motor comprises a stationary casing 112 suitably supported on the vehicle frame and is provided at its forward end with an end-plate 113 having couplings 114—115 to receive the pipes 86 and 87. It is understood that these pipes are stationary and do not rotate around the axis of the driven shaft. The driven shaft 57 extends backward from the pump casing into the motor casing, and between the casings the shaft is provided with universal joints contained in the housing 116 to accommodate any relative movement of the pump casing and the motor casing. The pipes 86 and 87 are also sufficiently flexible to accommodate such movement. For the purpose of description, we shall refer to that portion of the driven shaft which lies within the motor casing as the driven shaft 157, it being understood, however, that it is an extension of the driven shaft 57. The driven shaft 157 is suitably journalled in the casing at the opposite ends thereof by the bearings 117—118 and projects from the rear end of the casing 112 and is formed on its end to receive the connection to the propeller shaft, which extends to the rear driving axle. The end-plate 113 of the motor casing is provided with two diametrically opposed substantially semi-circular conduits 121—122 communicating respectively with the pipes 86 and 87 and these conduits open on the inner face of the plate in two diametrically opposed substantially semi-circular ports 123—124, these ports being provided at their ends with constricted extensions 125 for the reasons heretofore set forth in connection with the constricted extensions 85.

Disposed within the motor casing 112 is the motor cylinder block comprising the face-plate 126 on which are mounted the motor cylinders 127, in the present instance there being nine motor cylinders. These cylinders are preferably of greater size than the pump cylinders and are arranged in a manner similar to the pump cylinders, the motor cylinders being regularly spaced apart circumferentially with respect to the axis of the driven shaft and being arranged with their axes parallel to the axis of the driven shaft. The cylinder block is flexibly connected to the driven shaft, so that the block is permitted a limited wobble thus insuring complete surface contact of the face-plate 126 with the inner face of the end-plate 113, the connection to the shaft being made by means of a splined collar 128 provided with radially extending diametrically opposed cylindrical pins 129 on which are mounted blocks 130 which are disposed in longitudinal grooves 131 formed in the ring 132 which is secured to the cylinder block. The blocks 130 are provided with curved heads, concentric with a point on the axis of the driven shaft 157 and these curved surfaces are in contact with the bottom of the grooves. This provides a structure which is rigid circumferentially and radially but which is flexible in a plane normal to the axis of the driven shaft, so that the cylinder block may wobble slightly to permit complete surface contact between the face-plate 126 and the end-plate 113. The cylinder block, or rather the face-plate 126, is kept in tight contact with the end-plate 113 by a coiled spring 133, bearing at one end against a flange on the spacing member 134 surrounding the driven shaft and bearing against the ring 128, and bearing at its other end against the face-plate 126. The face-plate 126 is provided with a plurality of ports 135, one for each cylinder 127, and these ports are adapted to register with the ports 123—124 as the cylinder block rotates, to permit the inlet and discharge of liquid to and from the cylinders 127.

Disposed in each cylinder 127 is a piston 136 and the pistons are connected to a rotatable wobble plate 137 by piston rods 138 which are provided at their ends with ball joints 139, for reasons which have heretofore been set forth in connection with ball joints 46.

Since the cylinder block is rotatable synchronously with driven shaft 157, the reciprocation of the pistons in the cylinders 127 synchronize with the rotation of the cylinder block so that the proper cylinders are brought into communication at the proper time with the proper port 123—124 to produce the desired reciprocation of the pistons.

The rotatable wobble plate 137 is connected to the driven shaft 157 so that it rotates synchronously therewith, the connection being through a universal joint which permits the wobbling movement of the wobble plate 137. Splined to the shaft 157 and spaced from the ring 128 by the spacing member 141, is a sleeve 142 provided with diametrically extending pins 143 bearing in the gimbal ring 144 forming part of said universal joint between plate 137 and shaft 157. Secured to the wobble plate is a ring 145 provided with diametrically opposed pins 146 seated in the gimbal ring 144, the pins 146 being in a plane at right angles to the pins 143. This provides a universal joint between the driven shaft 157 and the wobble plate 137 and causes synchronous rotation of the shaft and the plate. The wobble plate 137 is mounted by means of the bearings 147—148 on the inclined backing plate 149, which for the purpose of adjustment of its angle of inclination is mounted on pivots 151 in the casing 112, the pivots 151 being alined with the pins 143. One of the pivots is preferably provided with an extension 152 to permit adjustment of the angularity of the backing plate by hand, when desired. The extension 152 is normally covered by a cap 153 and this cap is removed when it is desired to adjust the angularity of the plate by hand. By varying the angularity of the backing plate 149, the length of the stroke of the pistons 136 is varied and consequently the volumetric displacement of the motor, per revolution thereof, is varied. By varying the volumetric displacement of the motor per revolution thereof, the speed of rotation of the motor cylinder block with respect to the speed of rotation of the pump cylinder block is varied and consequently the speed of rotation of the driven shaft 157 with respect to the speed of rotation of the drive shaft 26 is varied. When the backing plate 149 is in the position of its greatest angularity with respect to the axis of the driven shaft 157, it is apparent that a larger volume of liquid will be required to cause one revolution of the cylinder block of the motor. The speed of the driving shaft is therefore greatly in excess of the speed of the driven shaft, causing a speed reduction as well as torque multiplication, and power is transmitted to the driven shaft both by the reaction on the backing plate 54 of the pump unit and by the additional power developed in the motor, which is transferred to the driven shaft through the wobble plate 137. When the backing plate 149 is in its position of greatest angularity, the speed reduction and torque multiplication from the driving shaft to the driven shaft is a maximum. As the backing plate 149 is adjusted to decrease its angle of inclination, the volumetric displacement of the motor, per revolution thereof, becomes less so that greater pressures are developed in the pump cylinders and a greater reaction force is applied to the backing plate 54, thereby transmitting a greater portion of the power through the driven shaft 57 to the driven shaft 157. When the backing plate 149 is moved to a position normal to the axis of the driven shaft 157, there is no displacement of liquid in the motor and consequently the pistons 43 in the pump cylinders are locked and all of the power is transmitted by reaction through the backing plate 54 to the driven shaft 57. Between the positions of greatest angularity and perpendicularity with respect to the axis of the driven shaft 157, different proportions of the power are transmitted to the driven shaft 157 by reaction and by the operation of the motor. As the volumetric displacement of the motor, per revolution thereof, is decreased, the speed of the driven shaft with respect to the speed of the driving shaft is increased, until such time that the volumetric displacement of the motor is reduced to zero, at which time the driving shaft and the driven shaft rotate in synchronism.

Means are provided for varying the inclination of the backing plate 149 in proportion to the load on the driven shaft 157, so that the speed reduction between the driving shaft and the driven shaft is automatically varied as the load on the driven shaft is varied. The pressure developed in the high pressure chamber 62 in the pump depends upon the load on the driven shaft and the variation in this pressure is employed to cause a change in the angularity of the backing plate 149 as the load on the driven shaft varies.

At a point midway between the pivots 151, the backing plate 149 is provided with an ear or extension 159, to which the piston rods 161—162 are connected. Formed in the motor casing, preferably at the bottom thereof, and in line with the ear 159, are two cylinders 163—164, the cylinders being preferably opposed and arranged in substantial alinement. The cylinder 163 is preferably of smaller bore than the cylinder 164. Disposed in the cylinder 163 is a piston 165 to which the piston rod 161 is connected and disposed in the cylinder 164 is a piston 166 to which the piston rod 162 is connected. Since the pistons are of different diameter, the application of the same pressure per square inch to both pistons will cause a movement of the pistons and thus cause rotation of the backing plate 149 about its pivot. This differential piston arrangement permits the utilization of liquid under the same pressure in both cylinders, to effect the movement of the backing plate. The cylinder 163 is provided in its end with a port 167 which is connected by the pipe 168 with the high pressure chamber 61 in the motor.

Figure 3:
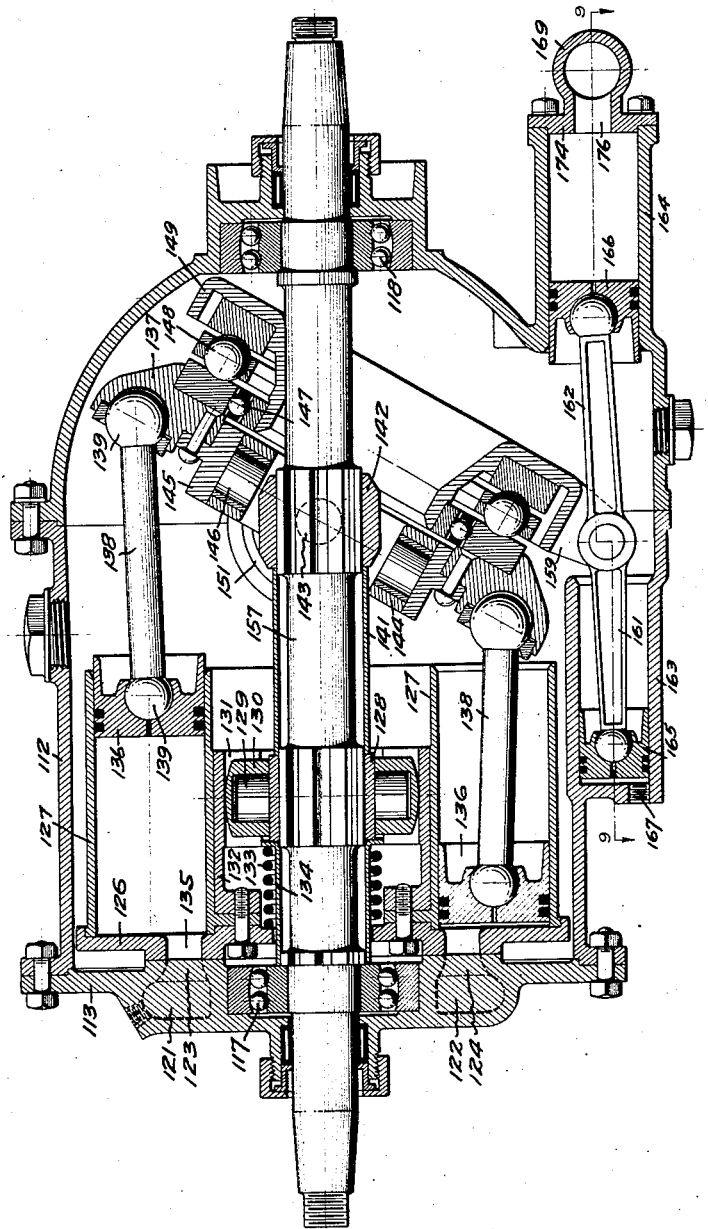
Figure 3 is a vertical section taken through the motor unit.
Figure 4:
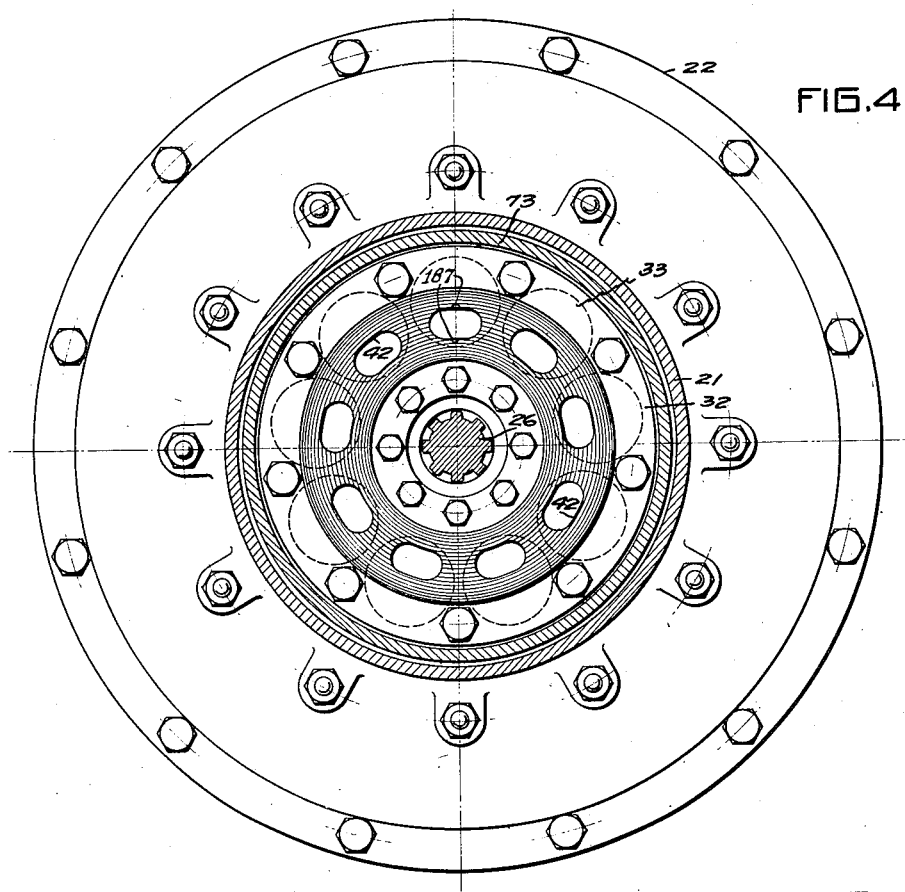
Figure 4 is a cross-section taken on the line 4—4 Figure 1, looking in the direction of the arrows.

Mounted on the end of the cylinder 164 is a valve chamber 169 having an opening in its bottom with which the pipe 168 connects, so that the high pressure liquid is transmitted both to the cylinder 163 and the valve chamber 169. Disposed in the valve chamber 169 is a sliding valve or piston 171 against which the pressure of the liquid is exerted and this pressure is resisted by a spring 172, the compression of which may be varied by turning the screw plug 173 against which the spring bears. The head 174 of the cylinder 164 is provided with a port 176 establishing communication between the cylinder 164 and valve chamber 169, and a port 175 which establishes communication between cylinder 164 and outlet connection 178. These ports are positioned to be covered and uncovered by the valve 171 as the pressure of the liquid on the valve varies. The valve chamber is provided above the valve 171 with a port 178 which is connected to the low pressure chamber 61 in the pump by the pipe 179. The spring 172 is set so that at a certain predetermined pressure, the valve 171 covers both of the ports 175 and 176. An increase in pressure over the predetermined pressure causes the valve 171 to move against the pressure of the spring, uncovering the port 176 and permitting the liquid under pressure to enter the cylinder 164. Since the cross-sectional area of this cylinder is greater than the cross-sectional area of the cylinder 163, the total pressure on the piston 166 is greater than the total pressure on the cylinder 165 so that the pistons are moved to the left, as shown in Figure 3, producing an increase in the inclination of the backing plate 149. In the event that the pressure of the liquid falls below the pressure exerted by the spring 172, the spring forces the valve 171 downward, uncovering the port 175 and establishing communication between the interior of the cylinder 164 and the low pressure chamber 61 in the pump. In this circumstance, the pressure against the piston 165 is greater than the pressure against the piston 166 and the pistons are moved toward the right, as shown in Figure 3, decreasing the inclination of the backing plate 149.

The spring 172 is so calculated that it will provide a force against the valve piston 171 which will maintain a pre-determined pressure in the pipe 168 and on the control piston 165. This causes the piston 165 to move to the right and allows the piston 166 to discharge its liquid through port 175, connection 178 and pipe 179 to the low pressure chamber of supply reservoir 61. It will be seen that a predetermined force is created by the piston 165 to hold the motor driving plate 149 in its vertical position. As the resistance increases on output shaft 157 the pressure in the pump chamber 62 increases thereby increasing the pressure on the piston valve 171. This causes valve 171 to uncover port 176 and close the port 175 immediately producing pressure on the piston 166. Piston 166 moves to the left due to the fact that its area is substantially greater than that of piston 165. This movement will change the inclination of motor angle plate 149, and providing the resistance to turning on the shaft 157 has not in the meantime increased, will cause the pressure in the pipe 168 to drop and the piston valve 171 will settle closing both the ports 175 and 176 thereby locking the pistons 165 and 166 and the motor angle plate 149 from fluctuations or change in position, until a further change in resistance at the driven shaft causes a change in fluid pressure which operates valve 171 and causes the parts to assume a new relative position. It will be seen that the control valve 171 and the differential pistons controlled thereby, will automatically control the capacity of the motor unit to overcome variable resistances to rotation of the driven shaft 157 permitting the prime mover to operate at a predetermined maximum torque delivery at which valve 171 will close both ports 175 and 176 locking the pistons hydraulically with the motor capacity held at the necessary value to overcome the resistance at the driven shaft. When the fluid pressure goes beyond the locking value the volumetric capacity of the motor will be increased and when the fluid pressure goes below the locking pressures the volumetric capacity of the motor is decreased. It is furthermore to be noted that when the pipes 86 and 87 are interconnected to establish a neutral condition the fluid pressures will drop and the motor angle plate will be shifted to vertical position under the influence of centrifugal force and the lower pressures developed.

During the operation of the apparatus, there will necessarily be a slight leakage of the liquid, which is preferably oil, between the movable contacting surfaces of the valves and cylinder face-plates and end-plates of the casings, and this liquid will accumulate in the pump casing 21 and the motor casing 112. Provision is made for retaining a quantity of liquid in these casings for the purpose of lubricating the moving parts of the apparatus, but it is not desirable to permit the liquid in the casing to accumulate so that it will rise above a predetermined level. Means are therefore provided for withdrawing the excess leakage liquid from the casing and for returning the liquid to the circulating system. Arranged above the apparatus at a suitable point is a vacuum tank 181 which is connected by the pipe 182 with the inlet manifold of the internal combustion engine, so that a vacuum is produced in said tank. This tank is provided with the usual partition walls and valves that are utilized in the usual vacuum tank, so that the condition of vacuum exists in the upper part of the tank, whereas the lower portion of the tank is subjected to atmospheric pressure. The vacuumized portion of the tank is connected by the pipe 183 with the pump casing 21 and the motor casing 112 at predetermined levels therein and, when the accumulating liquid in the casings reaches these levels, the liquid is withdrawn from the casings and discharged into the vacuum tank 181 and passes into the lower part of said tank. The lower portion of the tank is connected to the low pressure chamber in the pump by the pipe 184 and the lower portion of the tank 181 always contains a supply of liquid to supply any deficiency in the closed circulating system. The pipe 179 which communicates with the valve chamber 169 is also preferably connected to the pipe 184, so that liquid discharged from the valve chamber may return to the tank 181 or to the low pressure side of the system. By connecting both casings with the vacuumized chamber in the tank, a condition of vacuum exists in each casing, thereby tending to prevent the leakage of any liquid from the casing, so that the supply of liquid in the system is not depleted.

Figure 5:
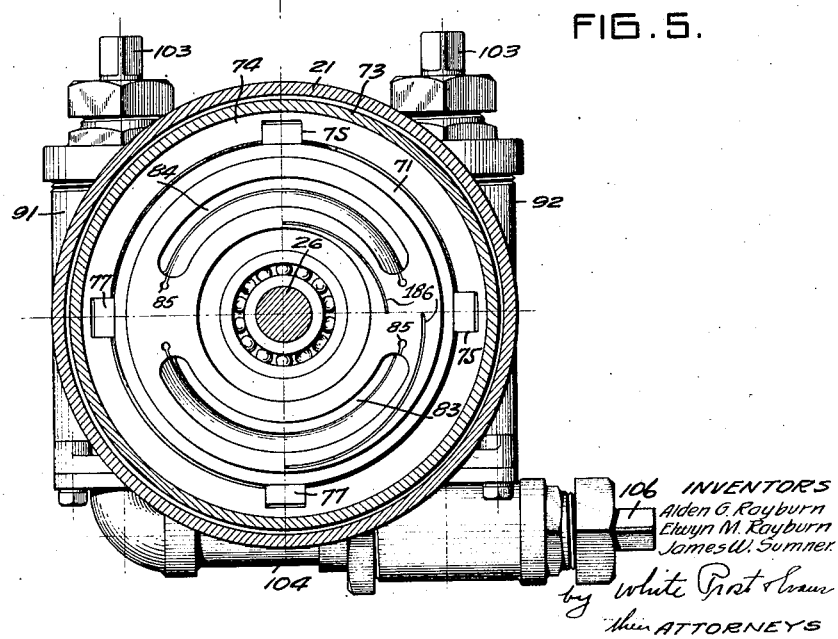
Figure 5 is a cross-section taken on the line 5—5 Figure 1, looking in the direction of the arrows.
Figure 6:
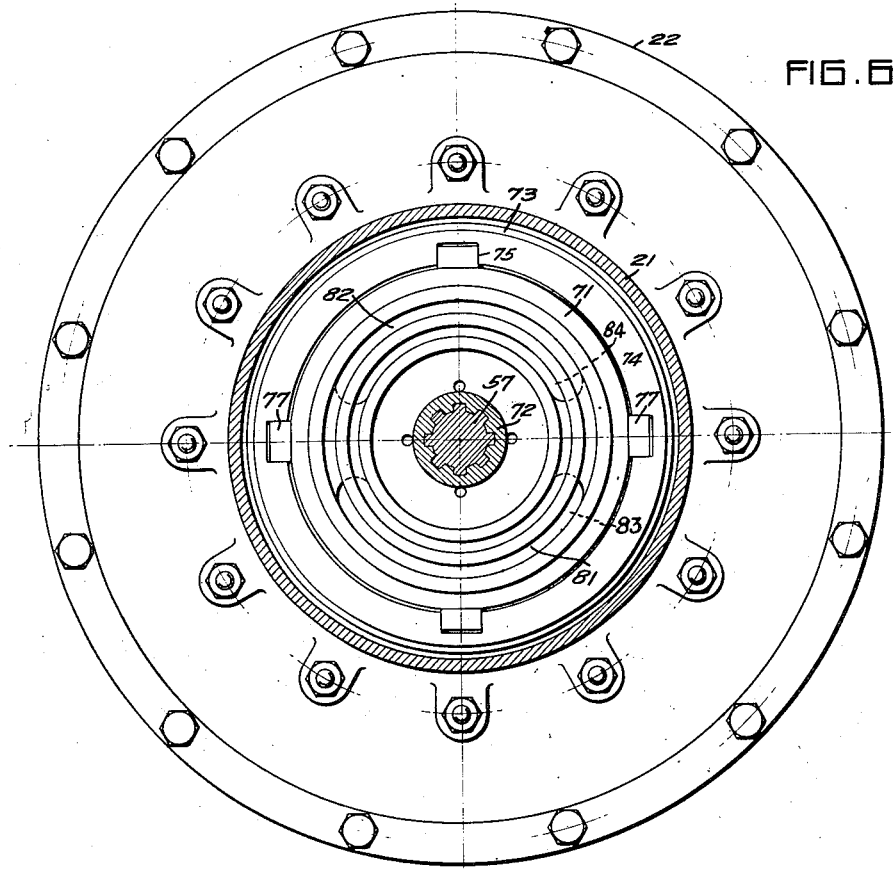
Figure 6 is a cross-section taken on the line 6—6 Figure 1, looking in the direction of the arrows.
Figure 7:
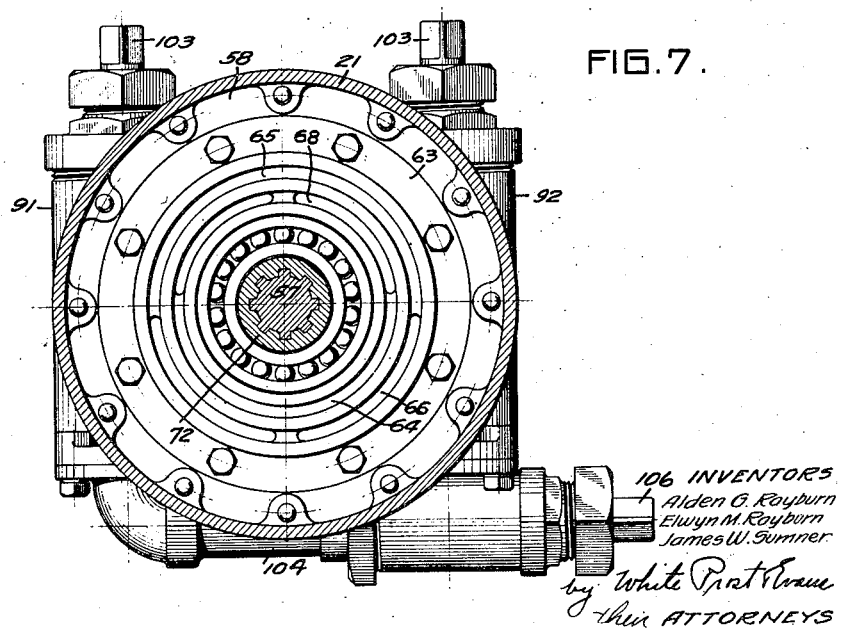
Figure 7 is a cross-section taken on the line 7—7 Figure 1, looking in the direction of the arrows.
Figure 8:
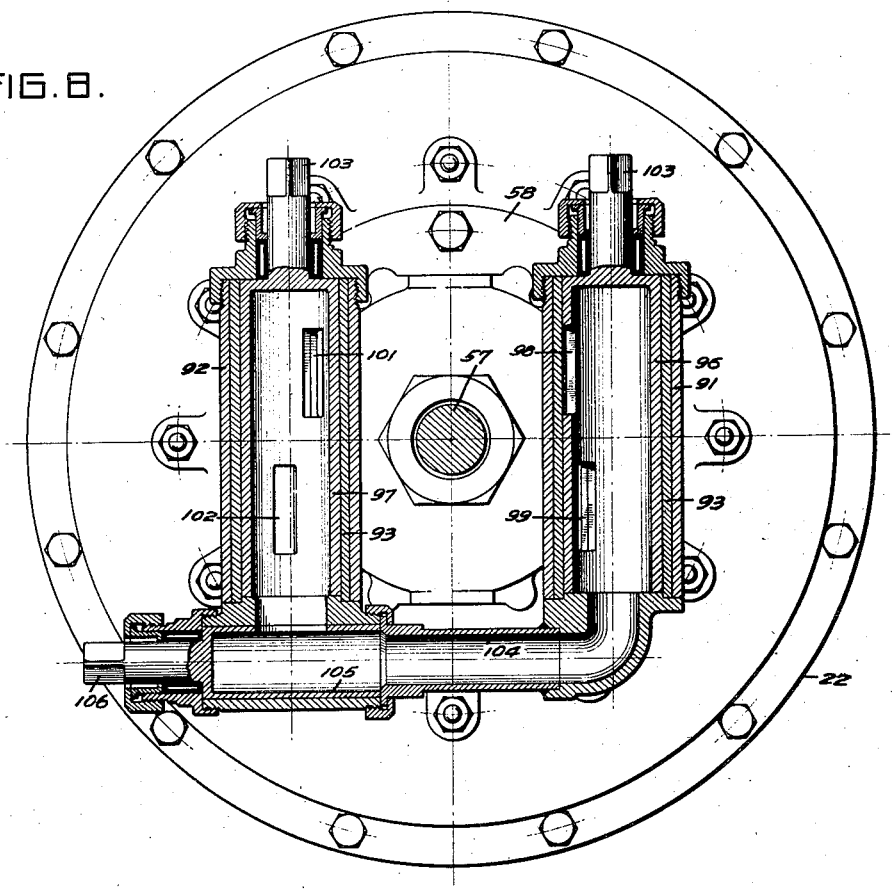
Figure 8 is a cross-section taken on the line 8—8 Figure 1, looking in the direction of the arrows.
Figure 9:
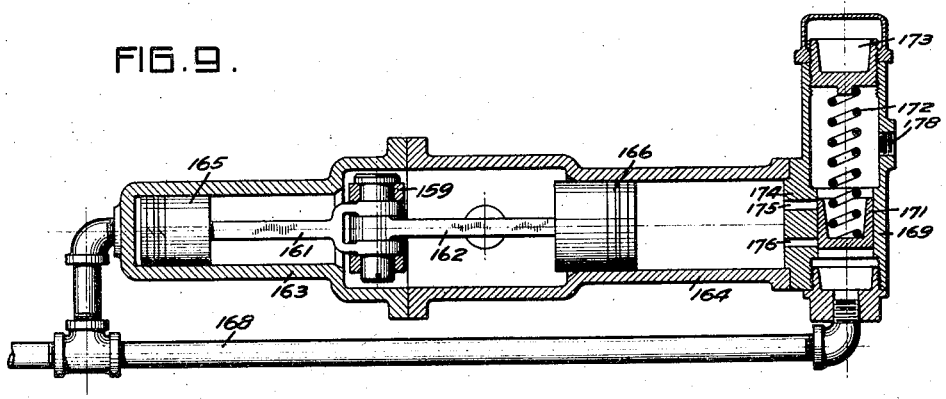
Figure 9 is a cross-section taken on the line 9—9 Figure 3.
Figure 10:
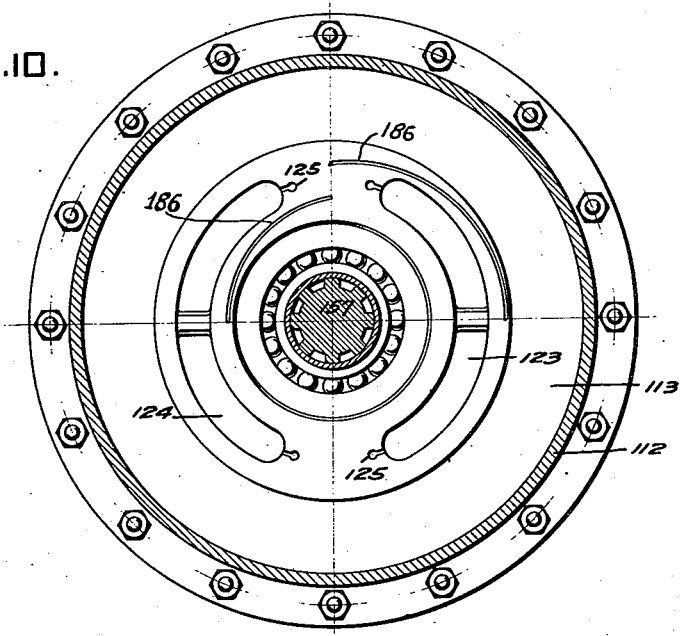
Figure 10 is a cross-section taken on the line 10—10 Figure 2, looking in the direction of the arrows.
Figure 11:
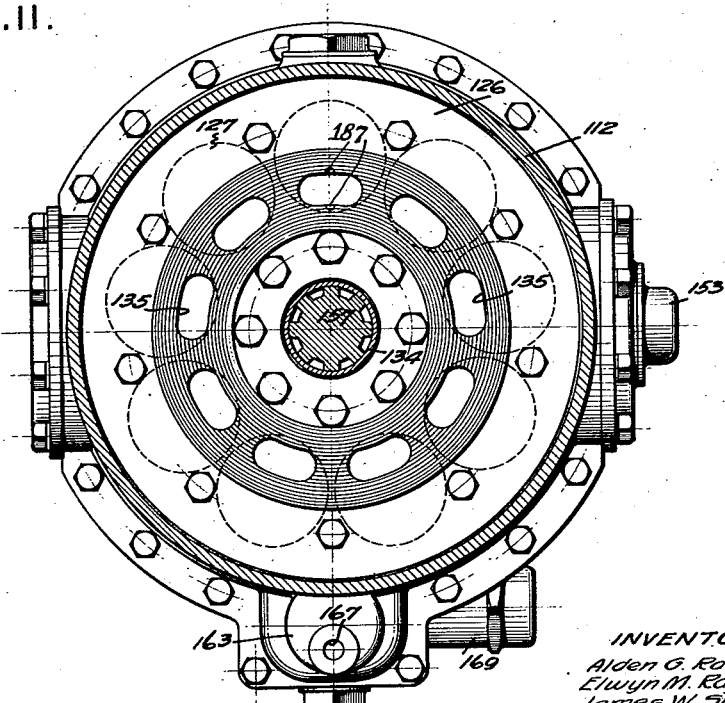
Figure 11 is a cross-section taken on the line 11—11 Figure 2, looking in the direction of the arrows.
Figure 12:
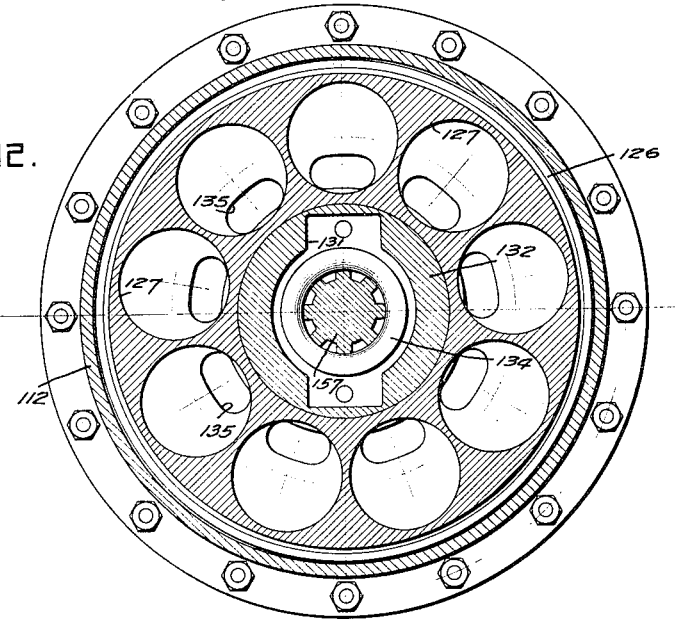
Figure 12 is a cross-section taken on the line 12—12 Figure 2, looking in the direction of the arrows.
Figure 13:
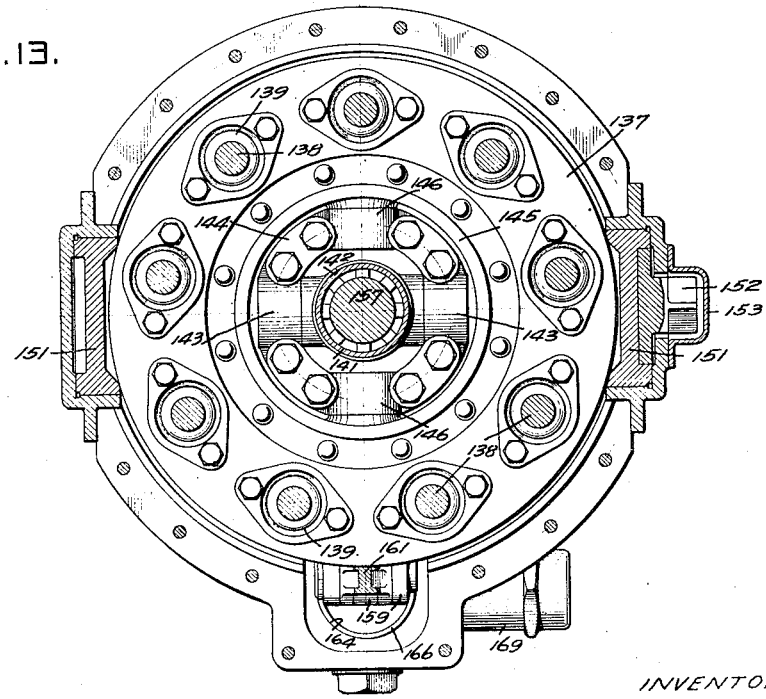
Figure 13 is a cross-section taken on the line 13—13 Figure 2, looking in the direction of the arrows.

To insure proper lubrication of the pump and motor timing valve faces as shown in Figures 5 and 10, shallow lubricating grooves or ducts 186 may be cut into the pump and motor valve faces which are brought into communication with lubricating notches 187 formed in the timing faces of the pump and motor cylinder blocks and communicating with a high pressure fluid port of the pump and motor so that fluid will be fed from the notches 187 into the lubricating ducts 186 during each revolution of the pump and motor cylinder blocks with relation to their respective valves, insuring that a proper supply of lubricating fluid will be fed to the rotating valve faces.

We claim:

1. A power transmission apparatus comprising a driving shaft, a liquid displacing pump operated by said shaft, a driven shaft, a motor actuated by displaced liquid connected to the driven shaft, means for determining the displacement volume of the motor per rotation thereof and means for moving said displacement determining means comprising a pair of opposed differential pistons connected to said means, a conduit for introducing liquid under pressure discharged from the pump behind the smaller piston, a conduit for conducting said liquid under pressure behind the larger piston, and a valve in the latter conduit actuated by variations in the pressure of said liquid for controlling the inflow and discharge of liquid from behind the larger piston.

2. A power transmission apparatus comprising a driving shaft, a liquid displacing pump operated by said shaft, a driven shaft, a motor actuated by displaced liquid connected to the driven shaft, means for determining the displacement volume of the motor per rotation thereof and means for moving said displacement determining means comprising a pair of opposed cylinders of different diameter, pistons in said cylinders connected to said displacement determining means, a conduit connecting the cylinders with the discharge side of the pump, a valve chamber interposed between the conduit and the larger cylinder and a valve in said chamber adapted to be moved due to variations in the pressure of the liquid for controlling the inlet and discharge of liquid from said cylinder.

3. A power transmission apparatus comprising a driving shaft, a liquid displacing pump operated by said shaft, a driven shaft, a motor actuated by displaced liquid connected to the driven shaft, means for determining the displacement volume of the motor per rotation thereof and means for moving said displacement determining means comprising a pair of opposed cylinders of different diameter, pistons in said cylinders connected to said displacement determining means, a conduit connecting the cylinders with the discharge side of the pump, a valve chamber interposed between the conduit and the larger cylinder, said valve chamber being provided on one side of the valve with an outlet port and a valve in said chamber adapted to establish communication between the conduit and the cylinder or between the cylinder and the outlet port.

4. A power transmission apparatus comprising a driving shaft, a liquid displacing pump operated by said shaft, a driven shaft, a motor actuated by displaced liquid connected to the driven shaft, means for determining the displacement volume of the motor per rotation thereof and means for moving said displacement determining means comprising a pair of opposed cylinders of different diameter, pistons in said cylinders connected to said displacement determining means, a conduit connecting the cylinders with the discharge side of the pump, a valve chamber interposed between the conduit and the larger cylinder, a valve in said chamber controlling the flow of liquid into and out of the cylinder and a spring engaging the valve and opposing the liquid pressure.

5. A power transmission apparatus comprising a driving shaft, a liquid displacing pump operated by said shaft, a driven shaft, a motor actuated by displaced liquid connected to the driven shaft, means for determining the displacement volume of the motor per rotation thereof and means for moving said displacement determining means comprising a pair of opposed cylinders of different diameter, pistons in said cylinders connected to said displacement determining means, a conduit connecting the cylinders with the discharge side of the pump, a valve chamber interposed between the conduit and the larger cylinder, said valve chamber being provided on that side of the valve remote from the conduit inlet with an outlet port, and a valve in said valve chamber adapted to be moved by variations in liquid pressure to establish communication between the conduit and the cylinder or between the cylinder and the outlet port.

6. A fluid transmission apparatus comprising driving and driven members; a pump operated to pump fluid by the difference in rotation of said driving and said driven members; a variable capacity motor delivering power to said driven member and actuated by fluid delivered thereto by said pump; and means, including a differential pressure-responsive device, operative at all capacities of said motor below the maximum capacity thereof for automatically varying the capacity of said motor in response to developed pump pressures to maintain the fluid pressure generated by said pump below a substantially constant predetermined value.

7. In a fluid operated transmission, driving and driven members; a fluid pump and motor arranged to variably transmit power between said driving and said driven members; and means responsive to the fluid pressure generated by said pump normally tending to reduce the ratio of torque multiplication between said driving and said driven members and operative when the fluid pressure exceeds a predetermined value to increase the torque multiplying ratio between said driving and said driven member.

8. A fluid operated power transmission comprising a driving and a driven member; a fluid pump operated to pump fluid by the difference in rotation of said driving and said driven members; a variable capacity motor delivering power to said driven member actuated by fluid delivered thereto by said pump; and means responsive to the fluid pressures generated in said pump normally tending to decrease the volumetric capacity of said motor and operative under predetermined fluid conditions to increase the volumetric capacity of said motor.

9. In a power transmission, the sub-combination of a variable capacity fluid motor; a shaft driven by said motor; and means responsive to the fluid pressures delivered to said motor normally tending to reduce the volumetric capacity of said motor, and under predetermined fluid pressure conditions operative to increase the volumetric capacity of said motor.

10. Hydraulic control means comprising a movable member the position of which is to be controlled; a supply source of fluid under a pressure influenced by the position of said movable member; a piston normally under hydraulic pressure tending to shift said movable member in one direction; a second piston adapted to operate said movable member; and control means for said second piston responsive to fluid pressures exceeding a predetermined value at said source to supply actuating fluid from said source to said second piston to cause shifting of said movable member.

11. Hydraulic control means comprising a movable member, the position of which is to be controlled; a supply source of fluid under a pressure influenced by the position of said movable member; a piston normally under hydraulic pressure tending to shift said movable member in one direction; a second piston adapted to shift said movable member in an opposite direction; and control means for said second piston responsive to fluid pressures of predetermined value at said source to hold said piston in fixed position, and operative when the fluid pressures at said source vary from said predetermined value to cause said pistons to shift said movable member in a direction dependent upon the variation of said fluid pressure from said predetermined values.

12. A fluid operated transmission embodying driving and driven members; a pump operated to pump fluid by the difference in rotation of said driving and said driven member; a variable capacity motor delivering power to said driven member and actuated by fluid delivered thereto by said pump; and means for varying the capacity of said motor to prevent the fluid pressures from exceeding a predetermined value and for holding the capacity of said motor fixed when the fluid pressures reach said predetermined value.

13. In a fluid operated transmission comprising driving and driven members; a fluid pump and motor arranged to variably transmit power between said driving and said driven members; means responsive to the fluid pressure delivered by said pump normally tending to decrease the torque ratio between said driving and said driven members and operative when the fluid pressure reaches a predetermined value to hold the torque multiplying between said driving and said driven members at a fixed value.

14. A fluid operated transmission comprising a driving and driven member; a fluid pump operated to pump fluid by the difference in rotation of said driving and said driven members; a variable capacity motor delivering power to said driven member and actuated by fluid delivered thereto by said pump; and means responsive to the fluid pressures generated in said pump normally tending to decrease the volumetric capacity of said motor and operative under predetermined fluid conditions to hold the volumetric capacity of said motor at fixed values.

15. A fluid operated transmission comprising a driving and driven member; a fluid pump operated to pump fluid by the difference in rotation of said driving and said driven members; a variable capacity motor delivering power to said driven member and actuated by fluid delivered thereto by said pump; and means responsive to the fluid pressures generated in said pump normally tending to decrease the volumetric capacity of said motor, operative under predetermined fluid pressure conditions to hold the volumetric capacity of said motor at fixed values and operative when the fluid pressures exceed said predetermined fluid pressure conditions to increase the volumetric capacity of said motor.

16. In a power transmission, the sub-combination of variable capacity motor; a shaft driven by said motor; and means responsive to the fluid pressures delivered to said motor normally tending to reduce the volumetric capacity of said motor and under predetermined fluid pressure conditions operative to hold the volumetric capacity of said motor at a fixed value.

17. In a power transmission, the sub-combination of variable capacity motor; a shaft driven by said motor; and means responsive to the fluid pressures delivered to said motor normally tending to reduce the volumetric capacity of said motor operative under predetermined fluid pressure conditions to hold the volumetric capacity of said motor at a fixed value and operative when the fluid pressures delivered to said motor exceed said predetermined fluid pressure conditions to increase the volumetric capacity of said motor.

18. In combination, a movable member; a control cylinder with a differential piston mounted therein actuating said movable member and comprising fluid inlet and outlet ports at one end of said cylinder; a control valve for said ports; and means for supplying fluid under pressure to the other end of said cylinder, and to said valve to simultaneously control the position thereof and to supply operating fluid to said inlet port.

19. In combination, a movable member; a control cylinder for said movable member comprising an actuating fluid operated piston; a connection for constantly supplying fluid under pressure to one side of said piston; fluid inlet and outlet ports for supplying fluid to the other side of said piston, said other side of the piston being of greater effective area than the side first mentioned; and a control valve adapted to simultaneously close said ports or to open only one of them; and means for supplying fluid under pressure to said valve to simultaneously control the position of said valve and to control the supply of operating fluid to said inlet and outlet ports.

20. In a control system, a cylinder; fluid inlet and outlet ports for said cylinder; a control valve for said ports; a spring urging said control valve in a direction to cover said fluid inlet port and to uncover said fluid outlet port; and means for supplying fluid under pressure to shift said valve in a direction tending to uncover said fluid inlet port and cover said fluid outlet port.

21. A hydraulic transmission comprising rotatable driving and driven members; a fluid pump and motor arranged to variably transmit power between said driving and said driven members; and fluid distributing means disposed between said pump and said motor comprising a ported member mounted for limited universal seating movement receiving fluid from said pump, said ported member being rotated by said driven member.

22. A torque multiplying transmission apparatus embodying a driving member; a driven member; a rotary pump comprising complemental elements, one of said elements actuated by said driving member and provided with a plurality of recesses receiving fluid in operation of the apparatus, another of said elements being operatively connected for actuation by said driven member and comprising members fitting into and expelling fluid from said recesses in operation of the apparatus; a reactance element for said expelling members, and a cage carried by said reactance element; a fluid motor driving said driven member; and means for distributing the fluid between said pump and said motor comprising a ported fluid distributing member mounted for limited universal movement within said cage and provided with a substantially flat face against which said pump elements seat.

23. A torque multiplying transmission apparatus embodying a driving member; a driven member; a rotary fluid pump comprising complemental elements, one of said elements being actuated by said driving member and provided with a plurality of recesses receiving fluid in operation of the apparatus, another of said elements being operatively connected for actuation by said driven member and complemental members fitting into and expelling fluid from said recesses in operation of the apparatus; a fluid motor driving said driven member; and means for distributing the fluid between said pump and said motor comprising a ported valve member engaged by said recessed pump element relatively rotatable and longitudinally slidable with respect to the pump elements and mounted to permit a limited universal seating movement to maintain the parts in fluid sealing engagement and to automatically compensate for wear in operation of the mechanism.

24. The combination as set forth in claim 23 in which said ported member is rotatable and slidable with said driven member.

25. The combination as set forth in claim 23 in which said motor comprises a plurality of rotatable cylinders, and in which said fluid distributing means comprises a stationary distributing member coacting with said ported valve member, said ported valve member being rotatable with said driven member.

26. A hydraulic transmission comprising a driving and driven member; a pump actuated by the difference in speed of rotation of said driving and said driven members; a hydraulic motor embodying rotary reciprocating means driving said driven member; stationary fluid receiving and distributing means interposed between said pump and said motor; and a plate valve member rotatable with said driven member interposed between said stationary distributing means and said pump.

27. The combination as set forth in claim 26 in which said rotatable valve member is mounted for seating movement with relation to said stationary means.

28. In a hydraulic transmission axially aligned driving and driven members; a stationary fluid distributing and receiving means surrounding said driven member; a fluid pump disposed on one side of said stationary distributing member actuated by the difference in rotation of said driving and said driven members; a fluid motor embodying rotatable reciprocable elements disposed on the opposite side of said stationary means; and a valve rotatable with said driven member interposed between said pump and said stationary means.

29. A torque multiplying hydraulic transmission comprising driving and driven members; stationary fluid receiving and distributing means surrounding said driven member; a fluid pump actuated by the difference in rotation of said driving and driven members delivering fluid to said stationary means; a rotatable valve driven by said driven member interposed between said stationary means and said pumps, timing the delivery of fluid by said pump to said stationary means; a second stationary fluid receiving and distributing means; fluid conduits interconnecting said first mentioned and said second mentioned fluid receiving and distributing means; and a motor embodying rotatable reciprocating elements timed by said second mentioned distributing means driving said driven member.

30. The combination as set forth in claim 29 in which said motor comprises a plurality of cylinders rotatable during operation of the mechanism.

31. The combination as set forth in claim 29 in which said motor comprises a driven shaft section together with a driving connection embodying a plurality of universal joints between said driven member and said driven shaft section.

32. A hydraulic transmission comprising driving and driven members; a fluid pump operated by the difference in rotation of said driving and said driven members; stationary fluid receiving and distributing means receiving fluid from and delivering fluid to said pump; a plate type valve rotated by said driven member controlling the flow of fluid between said pump and said distributing means; a variable capacity fluid motor embodying rotatable reciprocable means actuated by fluid circulated through said stationary distributing member; and a shaft driven by said motor driving said driven member.

33. A torque multiplying fluid transmission comprising driving and driven members; a fluid pump operated by the difference in rotation of said driving and said driven members; stationary means adapted to receive fluid from and deliver fluid to said pump, a valve driven by said driven member interposed between said stationary means and said pump timing the operation of said pump; a second stationary means; a variable capacity motor embodying rotatable reciprocable means receiving fluid from and discharging fluid into said second stationary means; fluid conduits interconnecting said first mentioned and second mentioned stationary means; a shaft driven by said motor; and a driving connection between said shaft and said driven member.

34. The combination as set forth in claim 33 in which said shaft and said driven member are in axial alignment and said driving connection comprises a shaft section with a plurality of universal joints.

35. A hydraulic transmission comprising a driving and driven member; a pump actuated by the difference in speed of rotation of said driving and said driven members; a hydraulic motor driving said driven member; and fluid distributing means comprising a stationary fluid distributing member having high and low pressure fluid chambers; and a valve member rotatable with said driven member coacting with said stationary member to distribute fluid between said motor and said pump in properly timed relation in operation of the mechanism; and an open connection from said low pressure chamber to atmosphere.

36. The combination as set forth in claim 35 in which said connection comprises a fluid storage tank feeding fluid under a gravity head into said low pressure chamber.

37. In a hydraulic transmission axially aligned driving and driven members; a stationary fluid distributing and receiving means having high and low pressure fluid chambers surrounding said driven member; a fluid pump disposed on one side of said stationary distributing member actuated by the difference in rotation of said driving and said driven members; a fluid motor disposed on the opposite side of said stationary distributing means; and receiving fluid therefrom driving said driven member; a valve rotatable with said driven member interposed between said pump and said stationary valve; and a gravity feed chamber open to atmosphere connected to said low pressure chamber.

38. A fluid operated transmission embodying driving and driven means; a fluid pump and motor arranged to variably transmit power between said driving and said driven means; and means, including a pressure-responsive device, for varying the capacity of said motor to prevent the fluid pressures developed by said pump from exceeding a predetermined value and for holding the capacity of said motor fixed when said fluid pressures reach said predetermined value.

39. A fluid operated transmission comprising driving and driven means; a fluid pump and variable capacity motor arranged to variably transmit power between said driving and said driven means; and means, including a pressure-responsive device, for varying the torque multiplying ratio between said driving and said driven means to prevent the fluid pressures developed by said pump from substantially departing from a predetermined value and for holding the torque multiplying ratio between said driving and said driven member fixed when said fluid pressures reach said predetermined value.

40. A hydraulic transmission comprising driving and driven means; a fluid pump and motor arranged to variably transmit power between said driving and said driven means; a collar carried by a portion of said pump and having its axis coincident with that of said driven means; and fluid distributing means disposed between said pump and said motor comprising a ported member universally mounted within said collar for relative seating movement and held in fluid sealing relationship under the influence of fluid pressures developed by said pump.

41. A torque multiplying transmission apparatus embodying a driving and driven member; a fluid pump operated by the difference in rotation of said driving and said driven members to pump fluid, comprising a member with a plurality of recesses formed therein receiving fluid and a complemental member having elements fitting into and expelling fluid from said recesses in operation of said apparatus; a rotatable fluid motor actuated by fluid delivered thereto by said pump driving said driven member; stationary fluid receiving and distributing means interposed between said recessed pump means and said motor; and ported means mounted for a seating movement against said stationary means; said pump and said ported means being held in relative fluid sealing relationship with relation to said stationary fluid receiving and distributing means by the action of fluid pressures developed by said pump.

42. A torque multiplying transmission apparatus embodying driving and driven means; a fluid pump and motor arranged to variably transmit power between said driving and said driven means; said pump comprising complemental units actuated by said driving and driven means respectively, and which may be thrust apart longitudinally by the pressure reactances developed in operation of the pump; a fluid distributing means interposed between said pump and said motor comprising relatively movable members; said pump and said members being maintained in fluid sealing relationship in operation by said pressure reactances.

43. The combination as set forth in claim 42 in which said relatively movable members comprise a stationary fluid receiving and distributing member, and a rotatable ported fluid distributing member.

44. The combination as set forth in claim 42 in which said relatively movable members comprise a stationary fluid receiving and distributing member, and a rotatable fluid distrbuting member driven by said driven means.

45. The combination as set forth in claim 42 together with resilient means for initially holding said pump, motor, and members in fluid sealing relationship.

46. A torque multiplying transmission apparatus embodying a driving member; a driven member; a rotary pump comprising complemental elements, one of said elements actuated by said driving member and provided with a plurality of recesses receiving fluid in operation of the apparatus, another of said elements being operatively connected for actuation by said driven member and comprising members fitting into and expelling fluid from said recesses in operation of the apparatus; a fluid motor driving said driven member; and means for distributing the fluid between said pump and said motor comprising a substantially flat faced ported fluid distributing member mounted on the driven shaft for seating movement of the rotary pump; said pump, motor, and distributing means being held in fluid sealing relationship in operation of the apparatus by fluid pressures developed by said pump.

47. A torque multiplying transmission apparatus embodying a driving means; a driven means; a rotary fluid pump comprising complemental elements, one of said elements being actuated by said driving means and provided with a plurality of recesses receiving fluid in operation of the apparatus, another of said elements being operatively connected for actuation by said driven member and comprising complemental means fitting into and expelling fluid from said recesses in operation of the apparatus; said recessed element being slidable longitudinally of said driving means in response to internal pump pressures; a fluid motor driving said driven means; and means for distributing the fluid between said pump and said motor comprising relatively movable and stationary members disposed between said recessed element and said motor; said pump and members thereby being held in relative fluid sealing relationship as a result of said longitudinal movement of the recessed pump element in a manner to automatically compensate for wear and variations due to temperature changes in operation of the apparatus.

48. The combination as set forth in claim 47 in which said relatively movable members comprise a stationary fluid receiving and distributing member, and a rotatable ported fluid distributing member.

49. The combination as set forth in claim 47 in which said relatively movable members comprise a stationary fluid receiving and distributing member, and a rotatable fluid distributing member driven by said driven means and designed for limited longitudinal movement with respect to said stationary member.

50. The combination as set forth in claim 42 together with resilient means for holding said pump and members initially in fluid sealing relationship.

51. A hydraulic torque multiplying transmission comprising a driving member; a driven member; a rotary pump element actuated by said driving member; a rotary pump element actuated by said driven member; a rotary hydraulic motor driving said driven member and actuated by fluid delivered thereto by the difference in rotation of said driving and driven members; and fluid distributing means interposed between said pump elements and said motor comprising annular high and low pressure fluid storage spaces, said low pressure storage space surrounding said driven member and being arranged in nested relationship within said high pressure storage space.

52. In combination, a driving shaft, and a driven shaft substantially in alignment therewith, a fluid pump actuated by said driving shaft, a fluid motor mounted upon said driven shaft in driving engagement therewith, and substantially in alignment with said pump, and fluid distributing means disposed between said pump and said motor; said means including a low pressure fluid chamber arranged around the axis of said driven shaft and an annular high pressure fluid chamber separate from and surrounding said low pressure chamber.

In testimony whereof, we have hereunto set our hands.

ALDEN G. RAYBURN.
JAMES WAYNE SUMNER
ELWYN M. RAYBURN.